US012519261B2

(12) United States Patent
Schneider

(10) Patent No.: US 12,519,261 B2
(45) Date of Patent: Jan. 6, 2026

(54) ELECTRICAL COUPLER

(71) Applicant: Ennovi Industries, Inc., East Providence, RI (US)

(72) Inventor: Richard Schneider, Livonia, MI (US)

(73) Assignee: ENNOVI INDUSTRIES, INC., East Providence, RI (US)

( * ) Notice: Subject to any disclaimer, the term of this patent is extended or adjusted under 35 U.S.C. 154(b) by 311 days.

(21) Appl. No.: 18/289,701

(22) PCT Filed: Jul. 2, 2022

(86) PCT No.: PCT/US2022/036039
§ 371 (c)(1),
(2) Date: Nov. 6, 2023

(87) PCT Pub. No.: WO2023/283151
PCT Pub. Date: Jan. 12, 2023

(65) Prior Publication Data

US 2024/0258732 A1 Aug. 1, 2024

Related U.S. Application Data

(60) Provisional application No. 63/218,692, filed on Jul. 6, 2021.

(51) Int. Cl.
*H01R 13/187* (2006.01)
*H01R 12/57* (2011.01)
(Continued)

(52) U.S. Cl.
CPC .......... *H01R 13/187* (2013.01); *H01R 12/57* (2013.01); *H01R 12/7082* (2013.01); *H01R 12/91* (2013.01)

(58) Field of Classification Search
CPC .. H01R 13/187; H01R 12/57; H01R 12/7082; H01R 12/91
See application file for complete search history.

(56) References Cited

U.S. PATENT DOCUMENTS 3,201,556 A * 8/1965 Baird ...................... H01H 1/42 200/282
6,722,926 B2 * 4/2004 Chevassus-More ... H02G 5/005 439/721
(Continued)

FOREIGN PATENT DOCUMENTS

DE 102017103843 A1 8/2018

OTHER PUBLICATIONS

European Search Report from Corresponding European Patent Application No. 22838289.1, dated Sep. 24, 2024.
(Continued)

*Primary Examiner* — Sean Gugger
(74) *Attorney, Agent, or Firm* — Paul Katterle

(57) ABSTRACT

A coupler for connection to a substrate for mounting electronic devices. The coupler includes a coupling contact formed from metal and having opposing planar surfaces. The coupling contact includes a body having a pair of arms and a pair of legs joined thereto. The coupling contact is pivotally mounted to a frame formed from metal. The frame includes a body having a center plate with front and rear appendages joined thereto. The center plate has a top edge about which the coupling contact may pivot. The frame further includes a pair of holders having holding slots formed therein, respectively. The holders are disposed on opposing sides of the center plate, respectively, whereby portions of the arms are disposed in the holding slots, respectively.

20 Claims, 10 Drawing Sheets

(51) Int. Cl.
*H01R 12/70* (2011.01)
*H01R 12/91* (2011.01)

(56) References Cited

U.S. PATENT DOCUMENTS

| | | | |
|---|---|---|---|
| 6,821,164 B2 | 11/2004 | Mills | |
| 6,890,221 B2 | 5/2005 | Wagner | |
| 8,197,289 B1 | 6/2012 | Faber et al. | |
| 9,559,453 B1 | 1/2017 | Luo | |
| 10,998,675 B2 | 5/2021 | Lynch | |
| 2008/0287011 A1 | 11/2008 | Piovesan | |
| 2010/0317213 A1 | 12/2010 | Andersen | |
| 2015/0333442 A1 | 11/2015 | Naganuma | |
| 2018/0301834 A1 | 10/2018 | Dandl | |
| 2019/0081439 A1* | 3/2019 | Schneider | H01R 12/585 |
| 2020/0274294 A1 | 8/2020 | Lynch | |

OTHER PUBLICATIONS

Written Opinion of the International Searching Authority for PCT/US2022/036039 mailed Nov. 9, 2022.
International Search Report for PCT/US2022/036039 mailed Nov. 9, 2022.

* cited by examiner

ELECTRICAL COUPLER

CROSS-REFERENCE TO RELATED APPLICATION(S)

This application is the U.S. national phase of PCT Application No. PCT/US2022/036039 filed on 2 Jul. 2022, which claims the benefit of priority under 35 U.S.C. § 119(e) to U.S. Provisional Patent Application No.: 63/218,692 filed on 6 Jul. 2021, which is herein incorporated by reference.

TECHNICAL FIELD

The present disclosure relates to an electrical coupler for connecting electronic and/or electrical parts that may be misaligned.

BACKGROUND

In an electronic system, it is necessary to establish electrical connections between constituent parts of the system. Often, these parts are relatively rigid and are connected together at fixed locations. For example, electronic devices may be connected to a printed circuit board (PCB) at fixed locations, such as plated through-holes in the PCB or metal pads on the PCB. While the PCB and the electronic devices may be produced in compliance with strict tolerances, the connection locations between the PCB and the electronic devices may nonetheless become misaligned due to tolerance stacking or other reasons.

A misalignment between the connection locations of parts can cause mating problems when the parts are connected together (or attempted to be connected together). For example, as set forth above, one of the parts may be a PCB with plated through-holes or pads as connection points. In such a situation, a connector is typically secured to the through-holes or pads using press-fit connections and/or soldering. Such connections, which are rigid and relatively fragile, can be physically damaged by errant forces that are produced when the misaligned parts are brought together. Even if the parts are not damaged, the electrical connections may not be as robust as they should be, due to the misalignment.

Based on the foregoing, it would be desirable to provide an electrical coupler for electrically connecting parts, wherein the coupler accommodates misalignment between the parts.

SUMMARY

A coupler is disclosed for connection to a substrate for mounting electronic devices. The coupler includes a coupling contact formed from metal and having opposing planar surfaces. The coupling contact includes a body having a pair of arms and a pair of legs joined thereto. The arms extend upwardly and define a slot therebetween, while the legs extend downwardly and define a gap therebetween. The coupler also includes a frame formed from metal and configured to hold the coupling contact so as to permit the coupling contact to pivot. The frame includes a body having a center plate with front and rear appendages joined thereto. The center plate has a top edge about which the coupling contact may pivot. The frame further includes a pair of holders having holding slots formed therein, respectively. The holders are disposed on opposing sides of the center plate, respectively, whereby portions of the arms of the coupling contact are disposed in the holding slots, respectively. Each of the holders includes a blade and a tang spaced apart to form the holding slot of the holder. The blades are joined to the center plate and extend upwardly and outwardly therefrom. The tangs are joined to the front and rear appendages, respectively.

BRIEF DESCRIPTION OF THE DRAWINGS

The features, aspects, and advantages of the present invention will become better understood with regard to the following description, appended claims, and accompanying drawings where:

DETAILED DESCRIPTION OF ILLUSTRATIVE EMBODIMENTS

Figure 1:
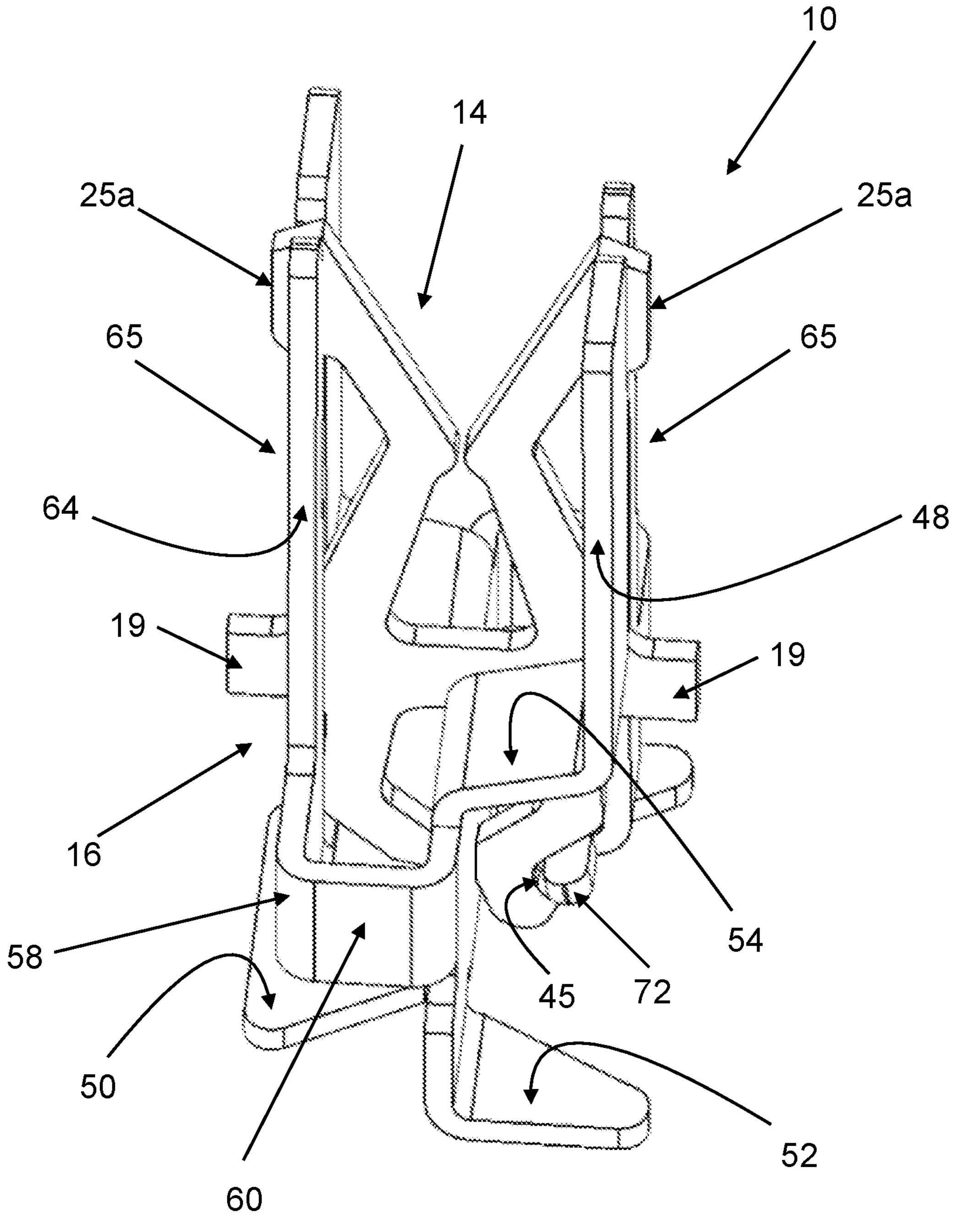
FIG. 1 is a front perspective view of a coupler of a first embodiment of the disclosure.

It should be noted that in the detailed descriptions that follow, identical components have the same reference numerals, regardless of whether they are shown in different embodiments of the present disclosure. It should also be noted that for purposes of clarity and conciseness, the drawings may not necessarily be to scale and certain features of the disclosure may be shown in somewhat schematic form.

Figure 2:
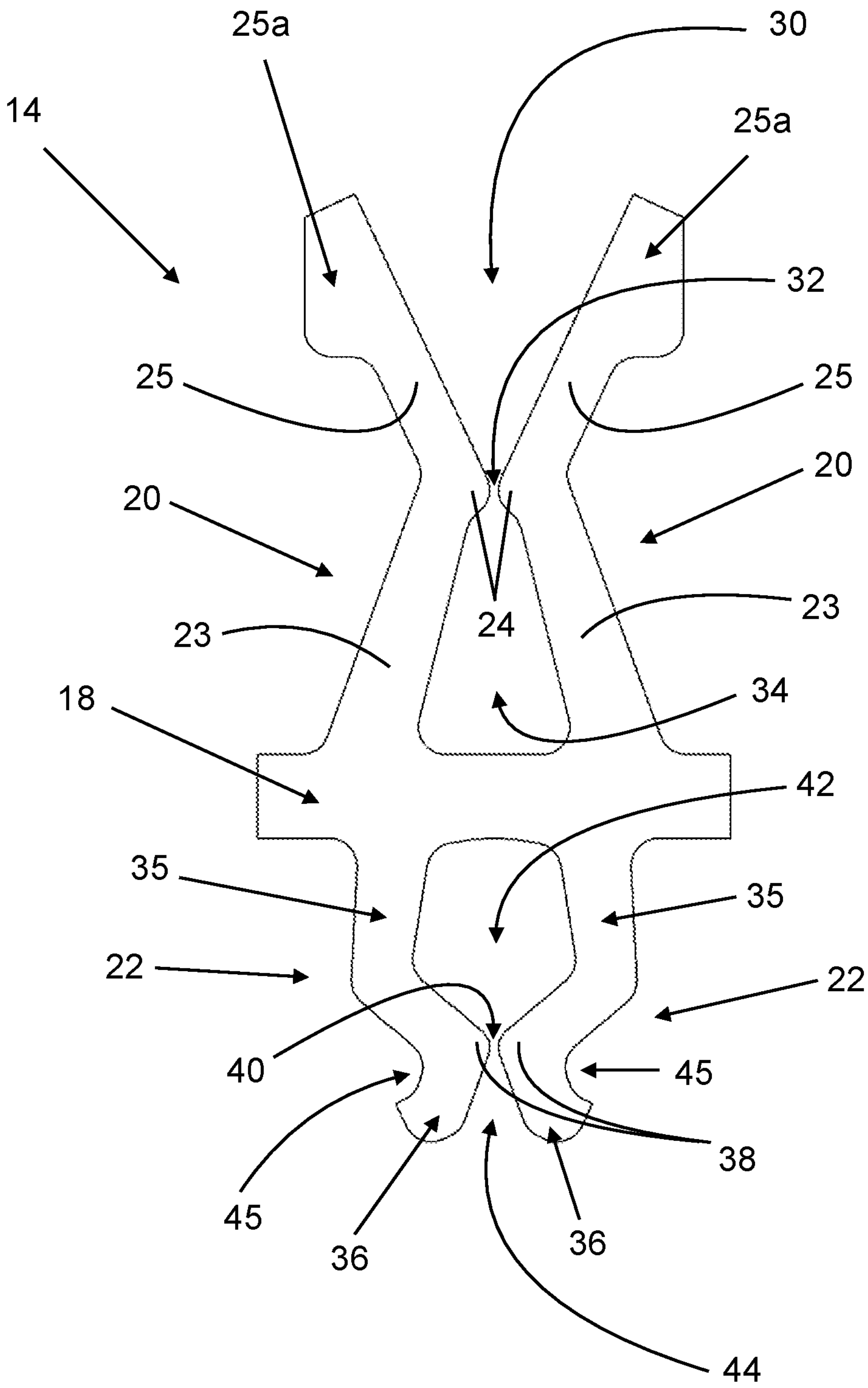
FIG. 2 is a front elevational view of a coupling contact of the coupler of FIG. 1.

Referring now to FIGS. 1 and 2, there is shown a coupler 10 constructed in accordance with this disclosure. The coupler 10 includes one or more coupling contacts 14 pivotally mounted in a housing or frame 16.

For purposes of facilitating description, components of the coupler 10 may be described with regard to X, Y, Z spatial coordinates, which are as follows: the X-axis extends in the direction of the thickness of the coupling contact 14; the Y-axis extends in the direction of the width of the coupling contact 14; and the Z-axis extends in the direction of the height of the coupling contact 14.

The coupling contact 14 is a unitary or monolithic structure and is electrically conductive, being formed from a conductive metal, such as a tin-plated copper alloy. The coupling contact 14 is thin and has opposing planar surfaces. As best shown in FIG. 2, the coupling contact 14 includes a center body 18 having a pair of arms 20 extending upwardly therefrom and a pair of legs 22 extending downwardly therefrom. The center body 18 is elongated and has opposing outer portions 19 that extend laterally outward, beyond outermost portions of the arms 20 and the legs 22.

Each arm 20 of the coupling contact 14 has an inner section 23 joined at a bend 24 to an outer section 25. The inner sections 23 are joined to the body 18 and extend upwardly and inwardly therefrom, toward each other. The outer sections 25 extend upwardly and outwardly from the bends 24, respectively, and have enlarged end portions 25*a*. The outer sections 25 define a large V-shaped upper slot 30, with a wide upper opening. The slot 30 narrows as it extends downwardly from the upper opening to a narrow gap 32 formed between inner surfaces of the bends 24. The inner sections 23 define an inner opening 34 that is joined to the outer slot 30 by the gap 32.

Each leg 22 of the coupling contact 14 has a dog-leg shape with an upper section 35 joined to a lower section 36 at a lower bend 38. A narrow gap 40 is formed between inner surfaces of the bends 38. The upper sections 35 cooperate with a lower surface of the center body 18 to define an inner opening 42, while the lower sections 36 define a small V-shaped lower slot 44, with a lower opening. The slot 44 narrows as it extends upwardly from the lower opening to the gap 40. The inner opening 42 is connected to the lower slot 44 by the gap 40. In each leg 22, an outer surface of the leg 22 at the lower bend 38 defines an indentation 45.

Figure 3:
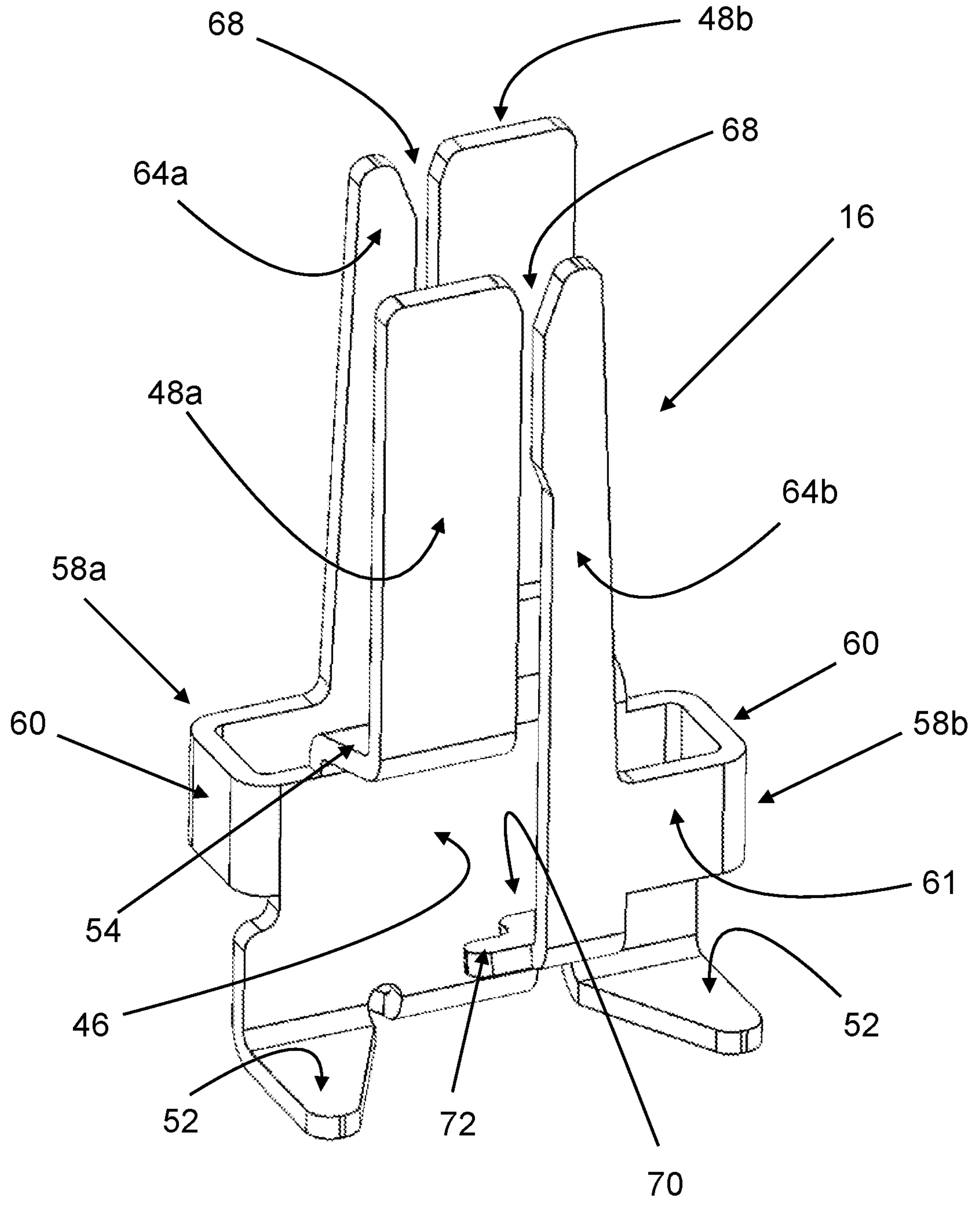
FIG. 3 is a right side perspective view of a frame of the coupler of FIG. 1.
Figure 4:
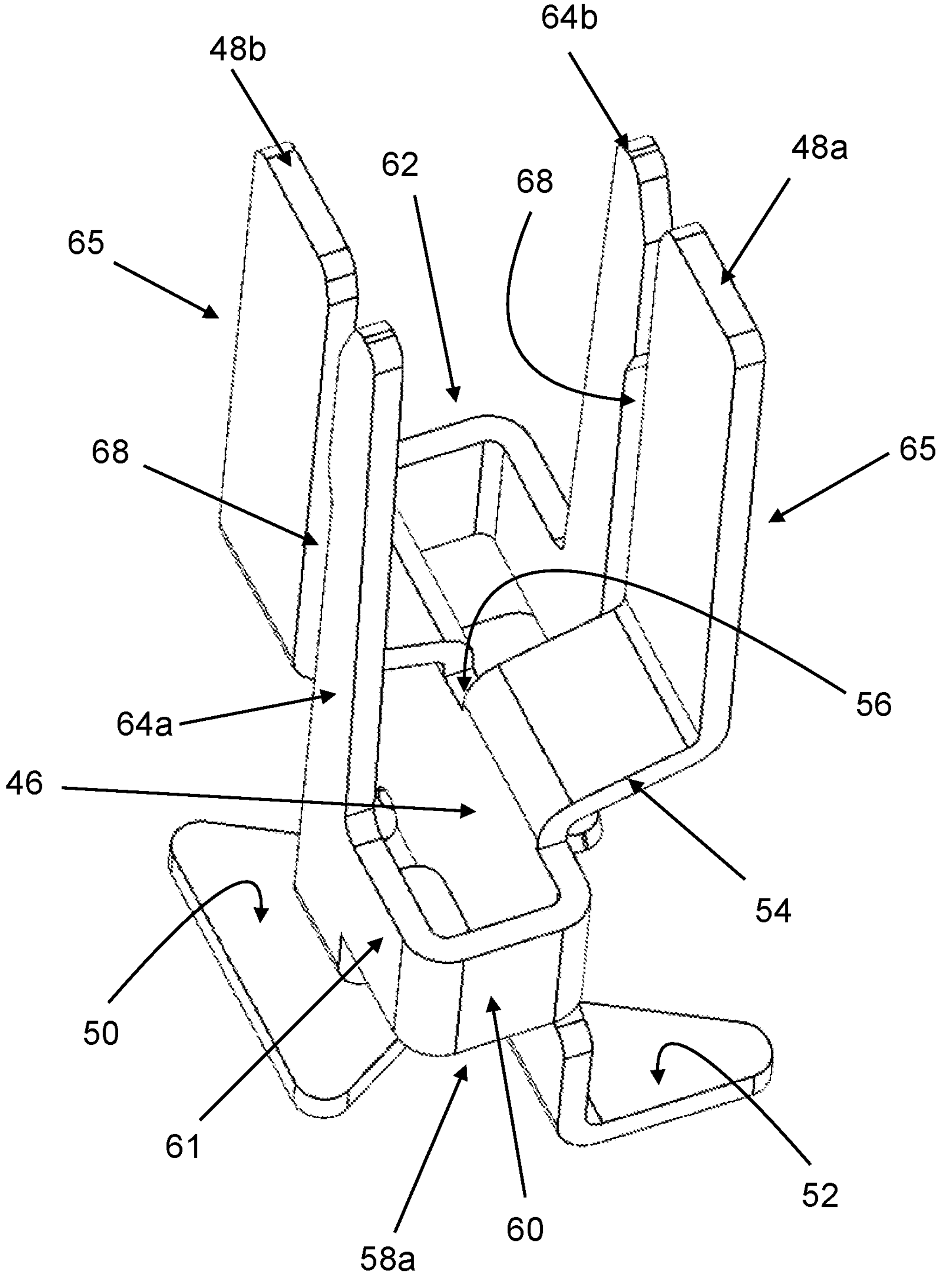
FIG. 4 is a front top perspective view of the frame of FIG. 3.

Referring now to FIGS. 3 and 4, the frame 16 is a unitary or monolithic structure and is formed from a conductive metal, such as a tin-plated copper alloy. The frame 16 includes a center plate 46 that extends vertically and has a top portion connected to a pair of blades 48 and a bottom portion joined to a major foot 50 and a pair of minor feet 52. The blades 48 have bent base portions 54, respectively, that are joined to the center plate 46. The center plate 46 has opposing outer surfaces that are planar and are vertically disposed. The base portions 54 slope upward and laterally outward from the top portion of the center plate 46, in opposing directions to each other. In this manner, the base portions 54 position main portions of the blades 48 so as to be disposed on opposing sides of a center plane extending between the outer surfaces of the center plate 46. The base portions 54 are spaced apart to form a pivot edge 56 in-between; the pivot edge 56 is part of a top edge of the center plate 46. The main portions of the blades 48 extend vertically upward from the base portions 54, respectively, and are arranged diagonal to each other.

The minor feet 52 are joined to the bottom portion of the center plate 46 by bends and extend laterally outward from the center plate 46 at about right angles. The major foot 50 is joined to the bottom portion of the center plate 46 by a bend and extends laterally outward from the center plate 46 at about a right angle. The minor feet 52 are disposed on one side of the center plate 46, while the major foot 50 is disposed on the other side of the center plate 46, with the major foot 50 being located between the minor feet 52 in the direction of the X-axis. The minor feet 52 extend laterally outward in a direction opposite to the major foot 50. The minor feet 52 and the major foot 50 have planar bottom surfaces adapted for surface mounting to metal pads of a substrate, such as a printed circuit board (PCB).

Front and rear appendages 58*a,b* are joined to front and rear portions of the center plate 46, respectively. Each appendage 58 is generally C-shaped and has an end panel 60 joined by two bends between side panels 61. The end panels 60 extend in opposing directions and the appendages 58 open in opposing directions. In this manner, the appendages 58 cooperate with the center plate 46 to form a generally S-shaped body 62.

Tangs 64 are joined to the appendages 58 and extend upwardly and downwardly therefrom. The appendages 58 position the tangs 64 so as to be disposed on opposing sides of the center plane and so as to be disposed adjacent to, and aligned with, the blades 48. More specifically, on each side of the center plane, the main portion of a blade 48 is aligned with a tang 64 to form a holder 65. The blade 48 and the tang 64 of each holder 65 are spaced apart so as to form a slot 68 in-between. The tangs 64 are narrower than the blades 48. Upper portions of the tangs 64 are enlarged and have tapered inner surfaces that form a narrowed portion of the slot 68 with a flared outer opening.

The tangs 64 extend lower than the blades 48 and have bent lower ends joined to flanges 70, respectively. The flanges 70 extend inwardly, toward the center plate 46 and are disposed at about right angles to the tangs 64, respectively. Each of the flanges 70 is notched to form a projection 72 spaced from the center plate 46. In the flange 70 for the front tang 64*a*, the projection 72 extends forwardly, while in the flange 70 for the rear tang 64*b*, the projection 72 extends rearwardly.

Figure 5:
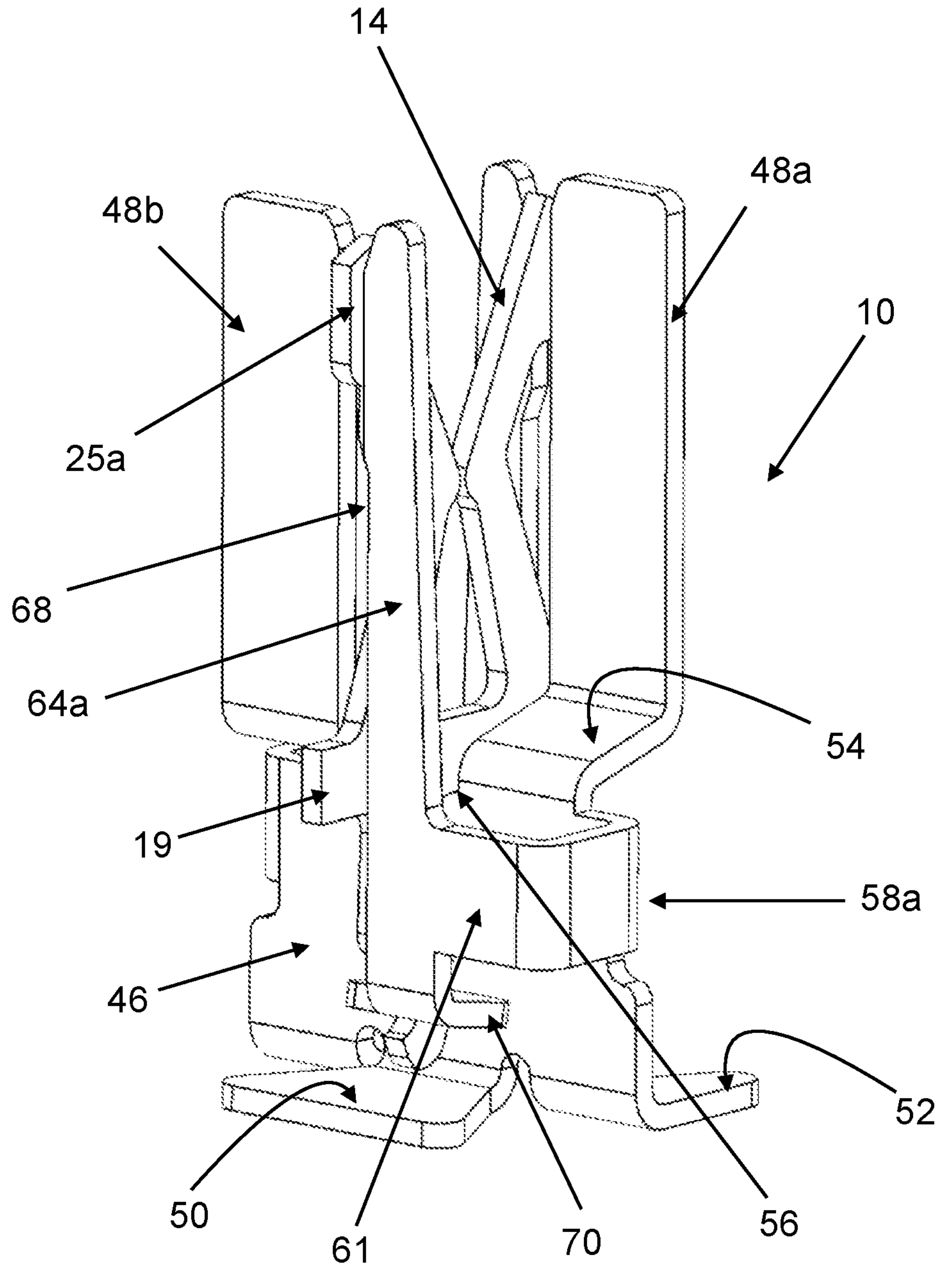
FIG. 5 is a left side perspective view of the coupler of FIG. 1.

Referring back to FIG. 1 and now also FIG. 5, the coupling contact 14 is mounted to the frame 16 by aligning the coupling contact 14 above the slots 68 in the holders 65 such that the gap 40 between the legs 22 is aligned with the pivot edge 56. With the coupling plate 14 so positioned, the coupling contact 14 and the frame 16 are then moved toward each other in the direction of the Z-axis. Relatively speaking, the outer portions 19 of the center body 18 move through the slots 68 of the holders 65 and the center plate 46 moves between the legs 22. The lower sections 36 of the legs 22 contact the projections 72, creating camming actions that move the lower sections 36 inward and then allow them to resiliently move outward again, thereby permitting the projections 72 to move into the indentations 45. The relative movement of the coupling contact 14 and the frame 16 continues until the lower surface of the center body 18 abuts the pivot edge 56 of the frame 16, at which point the coupling contact 14 is mounted to the frame 16.

When the coupling contact 14 is so mounted to the frame 16, the lower surface of the center body 18 rests on the pivot edge 56 of the center plate 46, the enlarged end portions 25*a* of the arms 20 extend through the slots 68 in the holders 65, respectively, and the projections 72 of the frame 16 extend into the indentations 45 of the coupling contact 14. The coupling contact 14 is held by the frame 16 so as to not be easily removed from the frame 16. The holders 65 prevent the coupling contact 14 from being removed in the X-direction, the center plate 46 prevents the coupling contact 14 from being removed in the Y-direction, and the projections 72 inhibit the coupling contact 14 from being removed in the Z-direction. Although the frame 16 holds the coupling contact 14, the frame 16 still allows the coupling contact 14 to pivot about the pivot edge 56.

The coupling contact 14 physically touches the frame 16 at the pivot edge 56, the holders 65, the base portions 54 and the flanges 70, thereby establishing an electrical connection between the coupling contact 14 and the frame 16. Thus, when an electrical conductor is electrically connected to the coupling contact 14, such as by being positioned in the gap 32 between the convex surfaces of the bends 24, the electrical conductor is also electrically connected to the frame 16 and its feet 50, 52.

Figure 6:
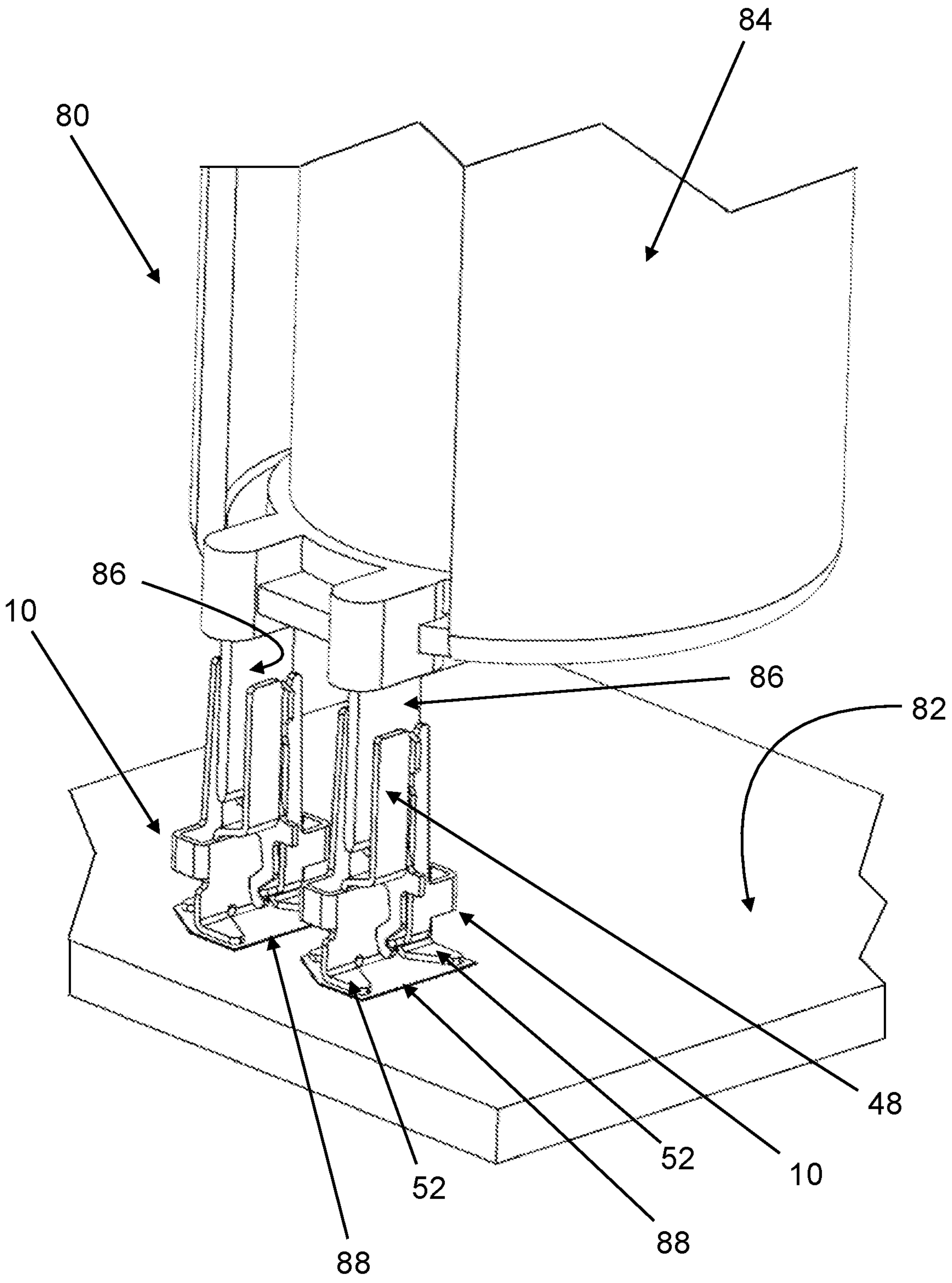
FIG. 6 is a partial perspective view of an assembly that includes two of the couplers of FIG. 1 connecting a solenoid device to a printed circuit board.
Figure 7:
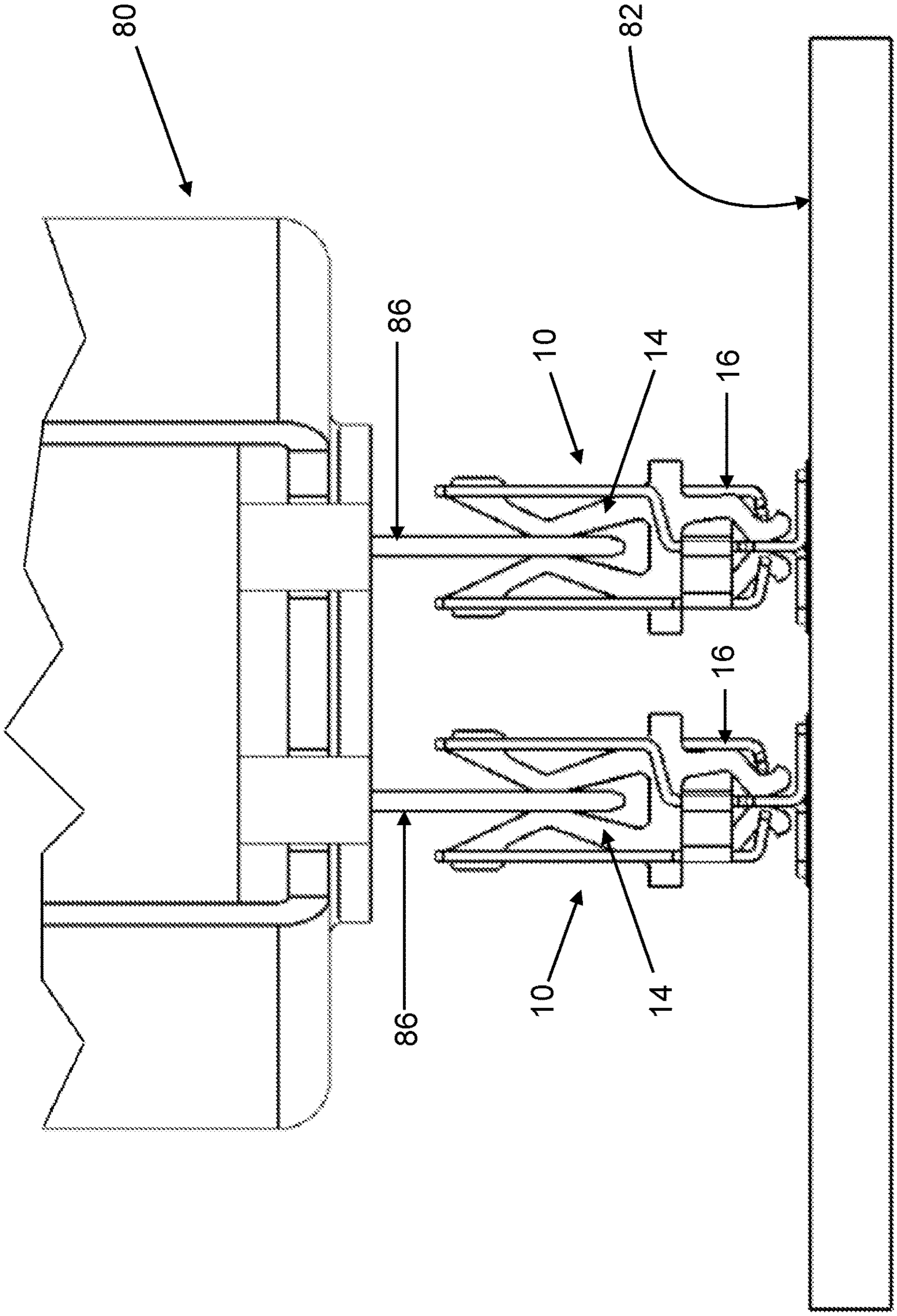
FIG. 7 is a partial front view of the assembly of FIG. 6.

Referring now to FIGS. 6 and 7, there is shown a solenoid device 80 mounted to a PCB 82 by a pair of couplers 10. The solenoid device 80 includes an outer housing 84 that encloses an electro-mechanical solenoid assembly, which is electrically connected to a pair of blades 86. The blades 86 have been inserted into the coupling contacts 14 of the couplers 10 such that in each coupler 10, the blade 86 extends through the slot 30 and through the gap 32. Inside the gap 32, convex surfaces of the bends 24 press against opposing surfaces of the blade 86. In this manner, the blades 86 are physically and electrically connected to the couplers 10.

The major foot 50 and the minor feet 52 of each coupler 10 are secured to a metal pad 88 of the PCB 82 such as by soldering so as to electrically and physically connect the coupler 10 to the PCB 82. Typically, the couplers 10 are secured to the PCB 82 before the solenoid device 80 is connected to the couplers 10.

The construction of the couplers 10 permit the solenoid device 80 to accommodate misalignment of the solenoid device 80 with the PCB 82 when the two devices are being connected together. Such misalignment may have the blades 86 of the solenoid device 80 being offset in the Y-direction from the centers of the slots 30 of the couplers 10 when the blades 86 are being inserted into the couplers 10, respectively. This offset causes the blades 86 to contact interior surfaces of the outer sections 25 of the coupling contacts 14 during the insertion, thereby causing the coupling contacts 14 to pivot about the pivot edges 56 of the frames 16. In each coupler 10, this pivoting permits the blade 86 to enter the gap 32 and separate the legs 22 to permit the blade 86 to extend therethrough. The resiliency of the legs 22 in each coupling contact 14 causes the convex surfaces of the bends 24 to press (apply forces) against opposing sides of the blade 86, thereby ensuring a firm electrical and physical connection between the blade 86 and the coupling contact 14.

Figure 8:
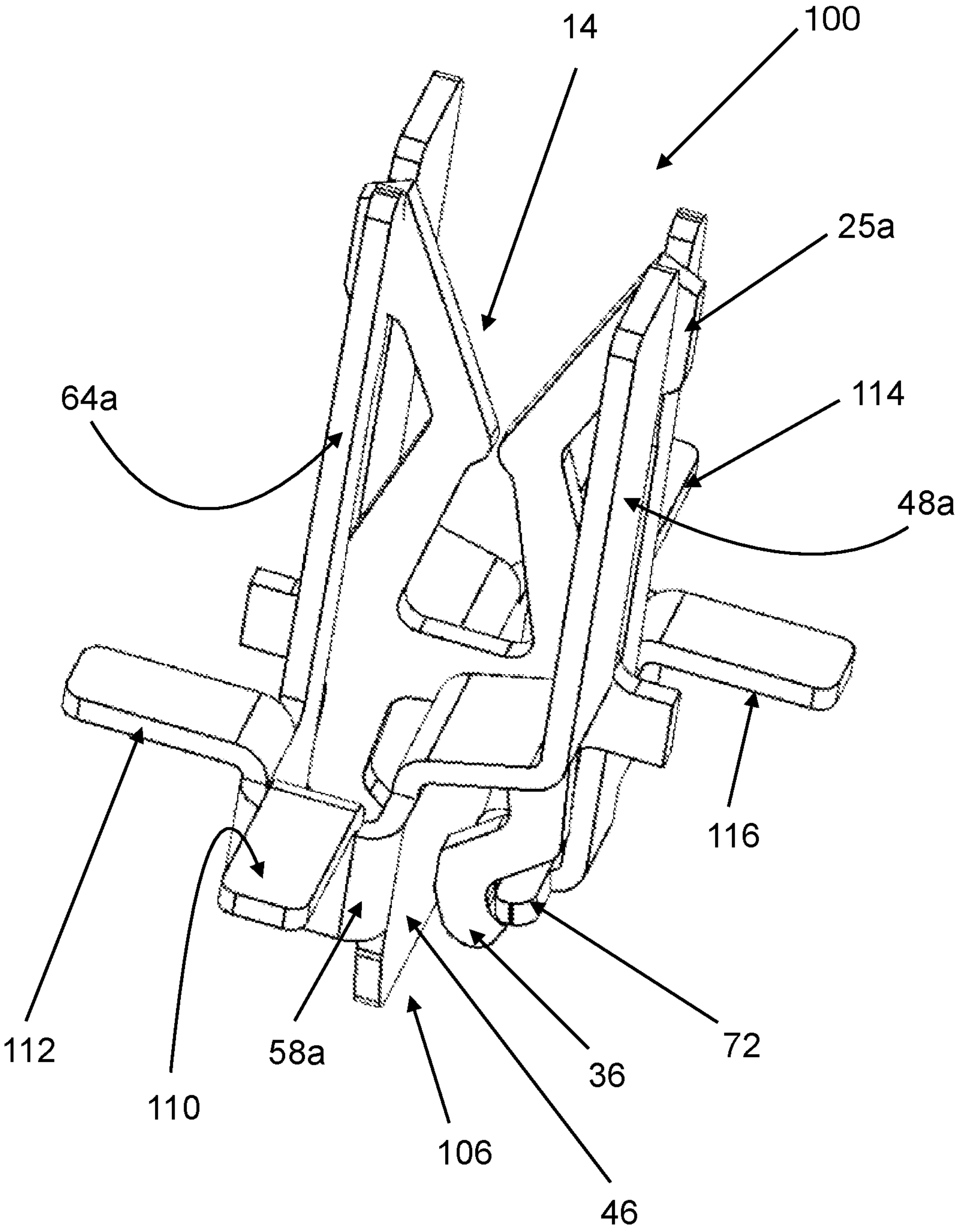
FIG. 8 is a front perspective view of a coupler of a second embodiment of the disclosure.
Figure 9:
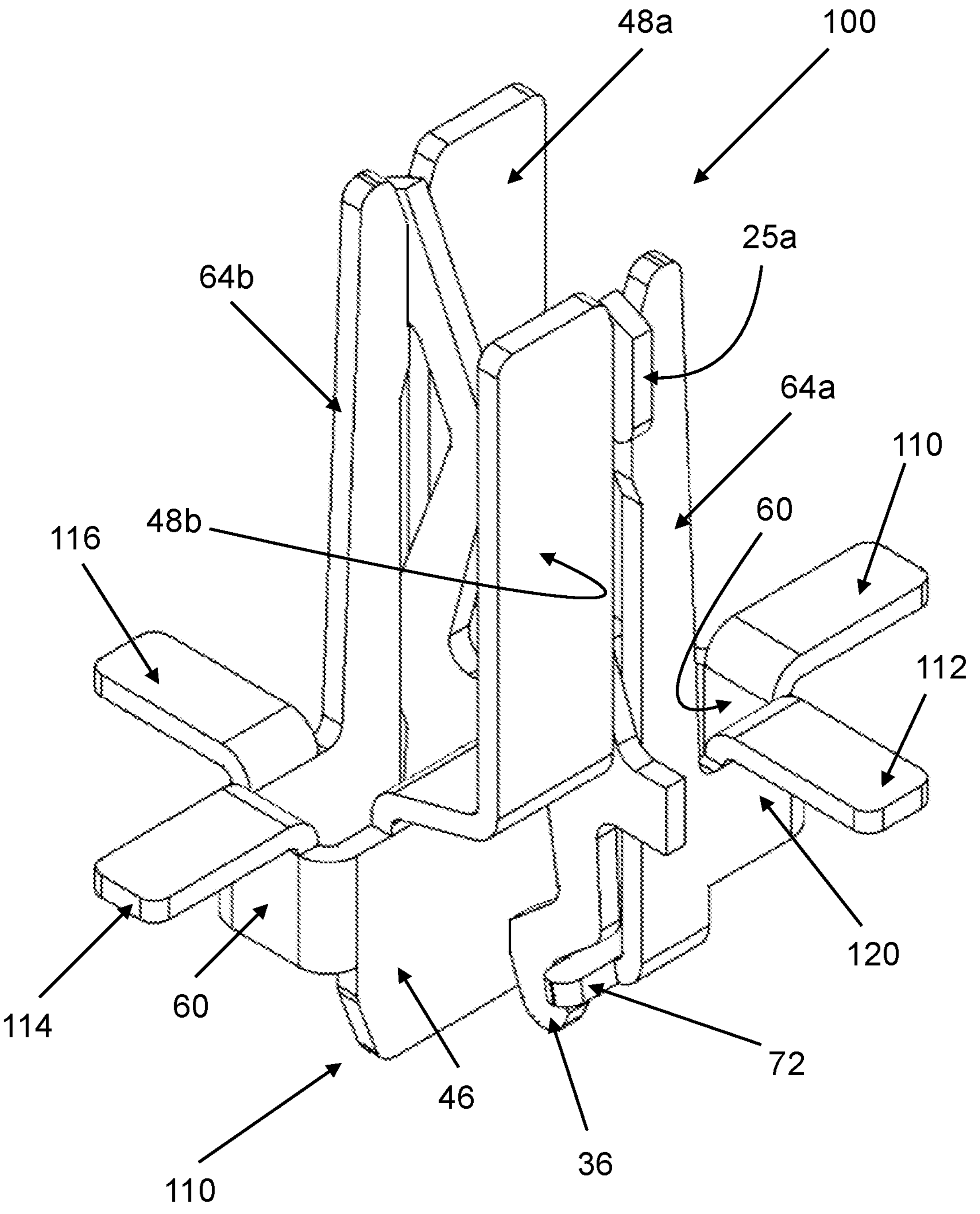
FIG. 9 is a rear, left side perspective view of the coupler of FIG. 8.
Figure 10:
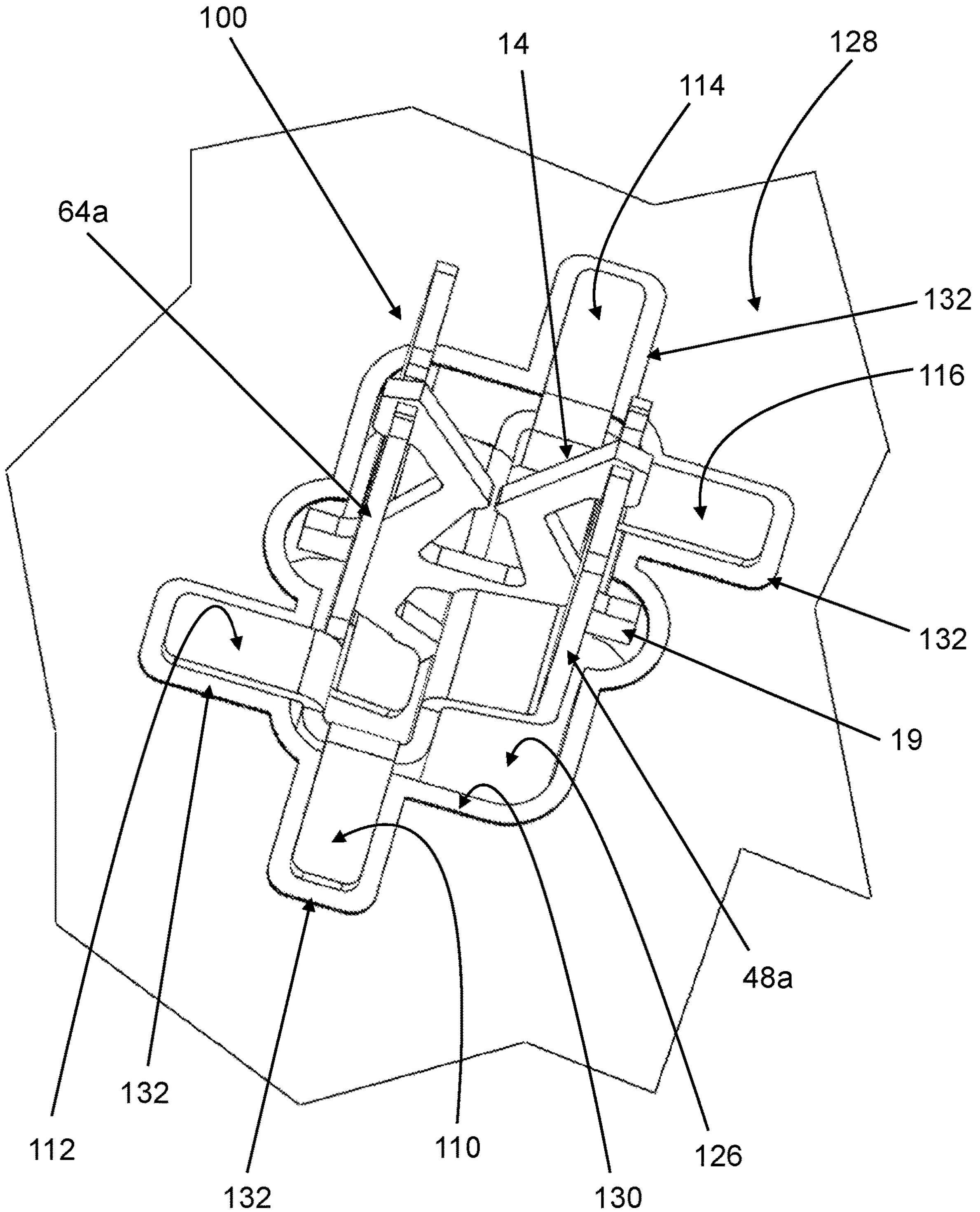
FIG. 10 is a top perspective view of the coupler of FIG. 8 secured to a printed circuit board.

Referring now to FIGS. 8-10, there is shown a second coupler 100 constructed in accordance with a second embodiment. The second coupler 100 has the same construction as the coupler 10 and operates in the same manner, except as specifically described below. Instead of having a frame 16, the second coupler 100 has a frame 106. The frame 106 has a construction the same as the frame 16, except for the differences described below. The frame 106 does not include the feet 50, 52. Instead, the frame 106 has a plurality of flange tongues joined to the body 62. More specifically, flange tongues 110, 112 may be joined to the front appendage 58*a*, while flange tongues 114, 116 may be joined to the rear appendage 58*b*. In the front appendage 58*a*, the flange tongue 110 may be joined to a top edge of the end panel 60 and extend forwardly therefrom, and the flange tongue 112 may be joined to a top edge of an outer side panel 61 and extend laterally outward therefrom. In the rear appendage 58*b*, the flange tongue 114 may be joined to a top edge of the end panel 60 and extend rearwardly therefrom, and the flange tongue 116 may be joined to a top edge of an outer side panel 61 and extend laterally outward therefrom. The flange tongue 110 is disposed at about a right angle to the flange tongue 112, and the flange tongue 114 is disposed at about a right angle to the flange tongue 116.

The second coupler 100 is configured for mounting in an enlarged opening of a PCB, such as is shown in FIG. 10. In the shown application, the opening 126 is in a PCB 128. The opening 126 is irregular and has a shape that corresponds to the outer perimeter of the second coupler 100. The opening 126 is defined by an inner surface that is plated with a conductive metal, such as silver or copper. The plating extends over a top surface of the PCB 128 that surrounds the perimeter of the opening 126 so as to form a plated boundary region 130. Pad portions 132 of the plated boundary region 130 are enlarged and correspond to the size and shape of the flange tongues 110-116, respectively. As such, the pad portions 132 may have a rectangular shape. The pad portions 132 are positioned so as to be aligned with the flange tongues 110-116 when the coupler 100 is disposed in the opening 126.

The coupler 100 is mounted in the opening 126 such that the body 62 of the frame 106 is mostly or completely disposed below the top surface of the PCB 128 and the boundary region 130. The holders 65 extend above the boundary region 130 and the top surface of the PCB 128. The lower surface of the center body 18 of the coupling contact 14 may be disposed just below the boundary region 130. As such, the opening 126 flares outward from the outer portions 19 of the center body 18 to permit the coupling contact 14 to pivot. The flange tongues 110-116 are secured to the pad portions 132, respectively, such as by soldering or welding. In this manner, the frame 106 and, thus, the entire coupler 100 is physically and electrically connected to the PCB 128.

While the couplers 10, 100 are shown as having only one coupling contact 14, it should be appreciated that in other embodiments, the couplers 10, 100 may each have a plurality of coupling contacts 14. In these embodiments, the dimensions of the pivot edge 56, the slots 68 and the projections 72 may be increased in order to accommodate the additional coupling contact(s) 14. More specifically, in the direction of the X-axis, the length of the pivot edge 56, the width of the slots 68 and the length of the projections 72 may be increased. The length of the pivot edge 56 and the width of the slots 68 may be increased by simply decreasing the widths of the blades 86. The dimensions of the pivot edge 56, the slots 68 and the projections 72 are changed to snugly hold the coupling contacts 14, while still allowing them to pivot.

It is to be understood that the description of the foregoing exemplary embodiment(s) is (are) intended to be only illustrative, rather than exhaustive. Those of ordinary skill will be able to make certain additions, deletions, and/or modifications to the embodiment(s) of the disclosed subject matter without departing from the spirit of the disclosure or its scope.

What is claimed is:

1. A coupler for connection to a substrate for mounting electronic devices, the coupler comprising:

a coupling contact formed from metal and having opposing planar surfaces, the coupling contact comprising a body having a pair of arms and a pair of legs joined thereto, the arms extending upwardly and defining a slot therebetween, and the legs extending downwardly and defining a gap therebetween;

a frame formed from metal and configured to hold the coupling contact so as to permit the coupling contact to pivot, the frame including a body having a center plate with front and rear appendages joined thereto, the center plate having a top edge about which the coupling contact may pivot, the frame further including a pair of holders having holding slots formed therein, respectively, the holders being disposed on opposing sides of the center plate, respectively, whereby portions of the arms of the coupling contact are disposed in the holding slots, respectively; and wherein each of the holders comprises a blade and a tang spaced apart to form the holding slot of the holder, the blades being joined to the center plate and extending outwardly and upwardly therefrom, and the tangs being joined to the front and rear appendages, respectively.

2. The coupler of claim 1, wherein the coupling contact is monolithic.

3. The coupler of claim 2, wherein the frame is monolithic.

4. The coupler of claim 1, wherein the frame further includes a plurality of feet joined to a bottom portion of the center plate, the feet extending laterally outward from the center plate.

5. The coupler of claim 4, wherein the feet are disposed at about right angles to the center plate.

6. The coupler of claim 5, wherein a first one of the feet is disposed on a first side of the center plate and a second one of the feet is disposed on a second side of the center plate, whereby the first and second feet extend in opposite directions.

7. The coupler of claim 1, wherein the front and rear appendages are each generally C-shaped and each comprise an end panel joined by bends between side panels.

8. The coupler of claim 7, wherein the front appendage opens rearwardly and the rear appendage opens forwardly.

9. The coupler of claim 7, wherein the body of the frame is generally S-shaped.

10. The coupler of claim 7, wherein the coupler is configured to be mounted in an opening in the substrate.

11. The coupler of claim 10, wherein a first flange tongue is joined to a top edge of the end panel of the front appendage and extends forwardly therefrom, and a second flange tongue is joined to a top edge of the end panel of the rear appendage and extends rearwardly therefrom.

12. The coupler of claim 11, wherein a third flange tongue is joined to a top edge of an outer one of the side panels of the front appendage and extends laterally outward therefrom, and a fourth flange tongue is joined to a top edge of an outer one of the side panels of the rear appendage and extends laterally outward therefrom.

13. The coupler of claim 7, wherein the tangs are joined to outer panels of the side panels of the front and rear appendages, respectively.

14. The coupler of claim 7, wherein flanges are joined to lower end portions of the tangs, respectively, and extend inwardly therefrom.

15. The coupler of claim 14, wherein projections are formed in the flanges, respectively, and wherein the projections are disposed in indentations formed in the legs of the coupling contact, respectively.

16. The coupler of claim 1, wherein each of the blades comprises a base portion joined to the center plate and extending at least outwardly therefrom, and an upper portion joined to the base portion and extending upwardly therefrom.

17. The coupler of claim 16, wherein the upper portions of the blades are aligned with the tangs and spaced therefrom to form the slots, respectively.

18. The coupler of claim 17, wherein the top edge of the center plate of the frame is disposed between the base portions of the blades.

19. A combination comprising the coupler of claim 1 and a printed circuit board having a top surface with a plurality of metal pads disposed thereon, wherein the frame further includes a plurality of feet joined to a bottom portion of the center plate, the feet extending laterally outward from the center plate, and wherein the feet of the coupler are secured to the metal pads of the printed circuit board, respectively.

20. A combination comprising the coupler of claim 1 and a printed circuit board having an enlarged opening therein, the opening being at least partially surrounded by metal plating disposed over a top surface of the printed circuit board, wherein the coupler is mounted in the enlarged opening such that the body of the frame is disposed below a top surface of the printed circuit board, and wherein one or more flanges are joined to the body of the frame and extend outwardly therefrom, the one or more flanges being secured to one or more portions of the metal plating of the printed circuit board.

* * * * *